April 23, 1963  D. E. BLACK  3,086,667
METER RACK
Filed Feb. 15, 1962  2 Sheets-Sheet 1

INVENTOR.
DOUGLAS E. BLACK.
BY Willard S. Grow
ATTORNEY.

April 23, 1963     D. E. BLACK     3,086,667

METER RACK

Filed Feb. 15, 1962     2 Sheets-Sheet 2

INVENTOR.
DOUGLAS E. BLACK.
BY
Willard S. Grow
ATTORNEY.

3,086,667
METER RACK
Douglas E. Black, Phoenix, Ariz., assignor to
Beniah C. Wheeler, Phoenix, Ariz.
Filed Feb. 15, 1962, Ser. No. 173,483
1 Claim. (Cl. 214—130)

This invention pertains to improvements in a meter rack particularly adapted to carry gas and water meters and the like on utility company trucks.

One of the objects of this invention is to provide a meter rack for a utility truck storage shelf which is readily adapted to receive and rigidly support a large variety of meters of varying size and shape.

Another object is to provide a meter rack for a service truck which is particularly adapted to easy placement and removal of the meters on the truck.

Still another object is to provide a meter rack which may be adjusted to a wide range of sizes of meters.

A further object is to provide a meter rack which swings the meter to a convenient loading and unloading position.

It is also an object to provide a meter rack in which the meter serves to lock itself in the rack when swung to a travelling position on the utility service truck to securely hold the meters against shock and damage during transportation.

Further features and advantages of this invention will appear from a detailed description of the drawings in which.

Figure 1:
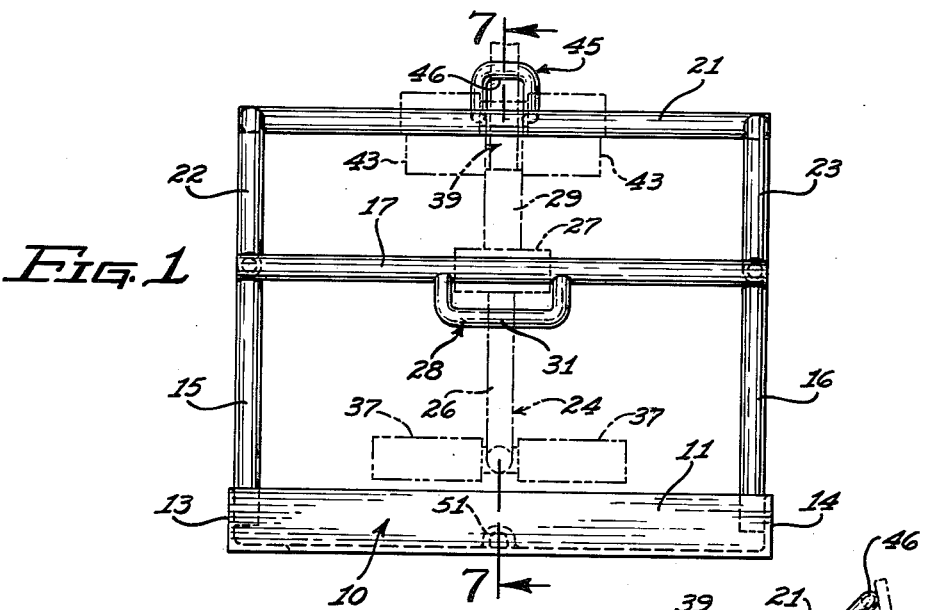
FIG. 1 is a front elevation of the meter rack frame; with the meter cradle and stop bracket indicated in phantom lines.
Figure 2:
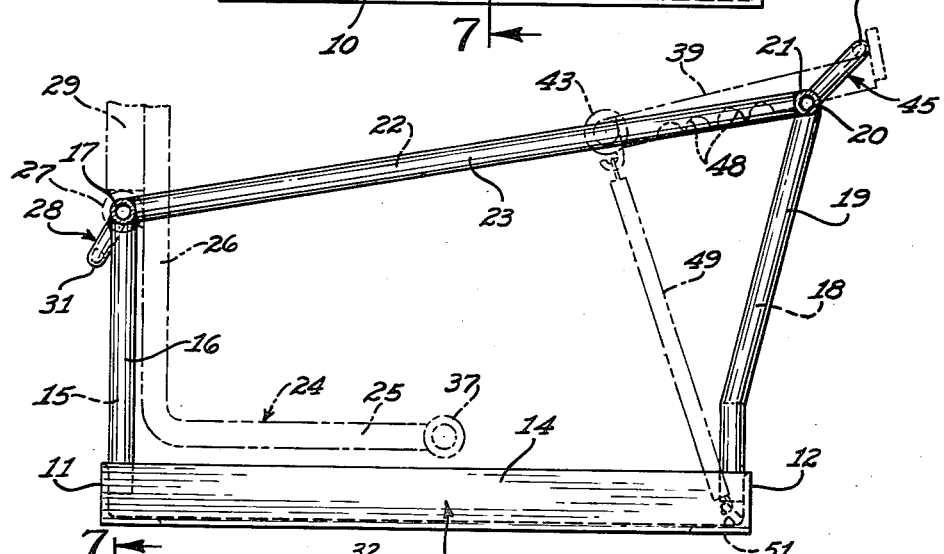
FIG. 2 is a side elevation of the meter rack frame.
Figure 3:
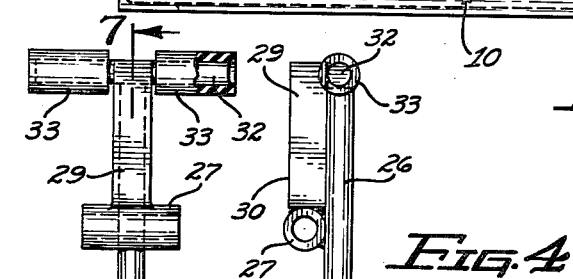
FIG. 3 is a front elevation of the meter cradle.
Figure 4:
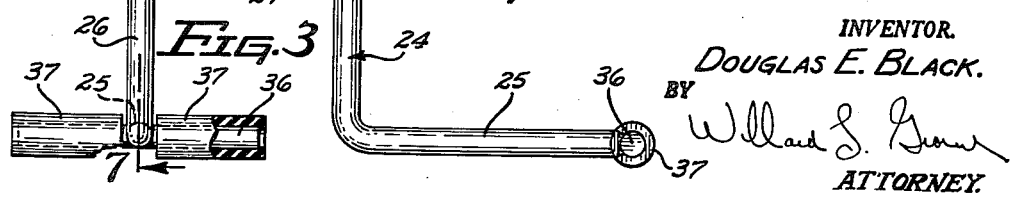
FIG. 4 is a side elevation of the meter cradle.
Figure 5:
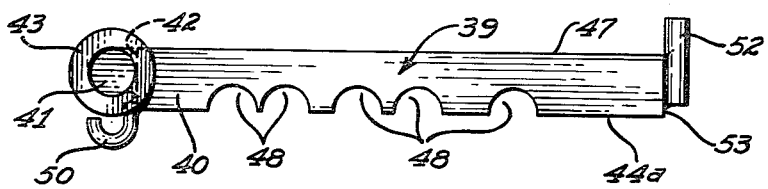
FIG. 5 is an enlarged side elevation of the stop adjustment bracket.
Figure 6:
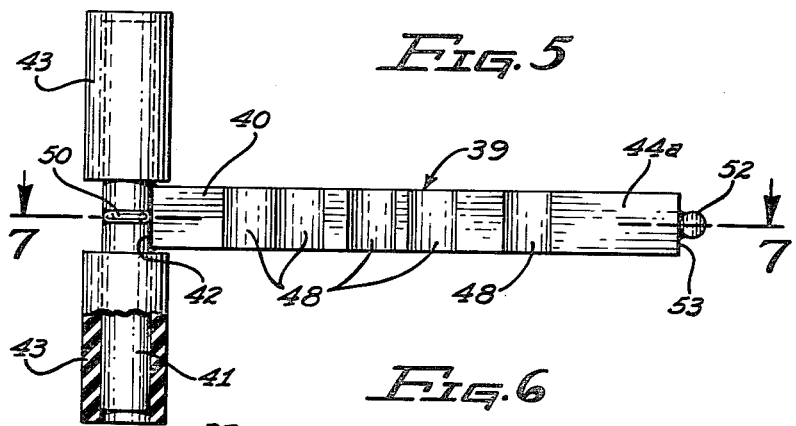
FIG. 6 is an enlarged bottom view of the stop adjustment bracket.

As an example of one embodiment of this invention there is shown a meter rack comprising a frame 10 consisting of a rectangular base formed of the front angle iron 11, the rear angle iron member 12, and the side angle iron members 13 and 14, which base is appropriately mounted on the utility truck (not shown). Any member of the meter rack units to be described may be utilized and placed side-by-side in the utility truck so that a description of one will suffice. Upstanding from and rigidly fixed to the front corners of the base are the front posts 15 and 16 and fixed to the top ends of the posts 15 and 16 is the front horizontal tie bar 17. Upstanding from and rigidly fixed to the rear corners of the base are the rear posts 18 and 19 which slope rearwardly and terminate in ends 20 to which is fixed the rear horizontal tie bar 21. Side tie bars 22 and 23 are rigidly fixed to the upper ends of the posts 15—18 and 16—19 of the frame structure.

Figure 7:
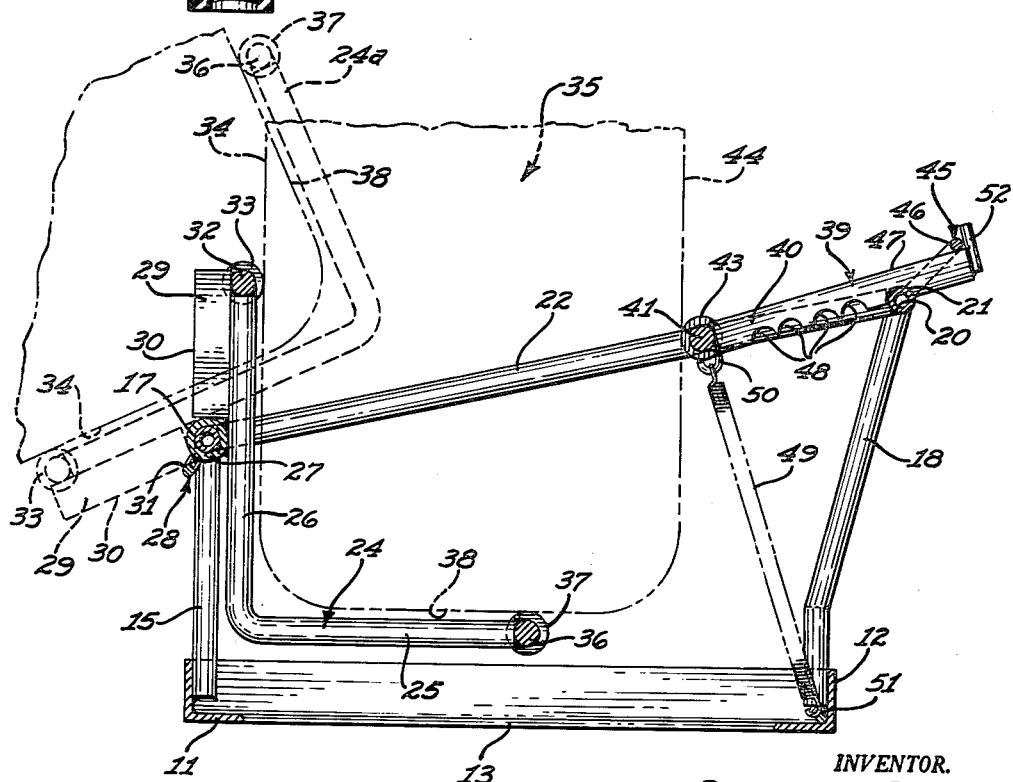
FIG. 7 is a sectional view of the meter rack showing the frame, meter cradle, and stop adjustment bracket assembled, indicated by the line 7—7 of FIGS. 1, 3 and 6.

The meter cradle indicated generally at 24 comprises the horizontal member 25 and the vertical member 26 formed integral therewith. Intermediate the ends of the vertical member 26 is a horizontally disposed bearing bushing 27 which is journaled on the front horizontal tie bar 17, FIG. 1, and is confined against axial movement thereon by the U-shaped stop member 28 fixed to the front horizontal tie bar 17 each side of the bushing 27. A stop block 29 is fixed to the upper end of the vertical member 26 and has an abutment surface 30 adapted to engage the horizontal portion 31 of the U-shaped stop member 28 when the meter cradle 24 is swung to loading and unloading position 24a as shown in broken lines in FIG. 7. A horizontally disposed bumper pin 32 is fixed intermediate its ends to the upper end of the vertical member 26 and the stop block 29 and has cushioned bumpers 33 adapted to engage the side 34 of a meter 35. A similar horizontal bumper pin 36 is fixed intermediate its ends to the outer end of the horizontal member 25 of the meter cradle 24 and has cushioned bumpers 37 adapted to engage the bottom 38 of the meter 35.

The stop adjustment bracket indicated generally at 39 comprises a longitudinally extending bar 40 having a bumper pin 41 fixed to its inner end 42 upon which are cushioned bumpers 43 adapted to engage the side 44, opposite the side 34, of the meter 35. In the bottom surface 44a of the bar 40 is formed a series of semi-cylindrical notches 48 which are adapted to engage over the rear horizontal tie bar 21. A U-shaped stop 45 fixed to the tie bar 21 each side of the bar 40 confine the bar 40 axially of the tie bar 21 while the horizontal portion 46 of the U-shaped stop 45 engages the top surface 47 of the stop adjustment bracket bar 40 so as to limit counterclockwise swinging of the bar 40, FIG. 7, with one of its notches in engagement with the tie bar 21 to the position shown in FIG. 7. A tension spring 49 having its upper end attached to a hook 50 fixed to the bumper end of the bar 40 and connected at its lower end to a hook 51 fixed to the base of the frame 10 serves to yieldingly hold the bar in proper meter engaging position shown in FIG. 7. The bar 40 may be lifted up and swung clockwise to engage any desired notch 48 with the tie bar 21 to accommodate the meter rack to receive any sized meter 35. The stop pin 52 fixed to the outer end 53 of the bar 40 is adapted to engage the horizontal portion 46 of the U-shaped stop 45 to limit inward movement of the stop bar 40 to proper operative positions on the frame 10.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

A meter rack comprising in combination:

a. a frame,
b. an L-shaped meter cradle pivotally on one side of said frame having,
c. a horizontal member,
d. a cushioned bumper on the outer end of said horizontal member adapted to engage the bottom of the meter,
e. a vertical member,
f. a cushioned bumper on the upper end of said vertical member adapted to engage a side of said meter,
g. a stop block on the upper end of said meter cradle adapted to engage said frame to stop swinging movement of said meter cradle at a predetermined loading-and-unloading position for said cradle,
h. a stop adjustment bracket on the other side of said frame comprising,
i. a bar,
j. a series of notches in the bottom of said bar adapted to engage said frame to longitudinally position said bar relative to a meter in said meter cradle when swung to carrying position, k. a cushioned bumper on the inner end of said bar adapted to engage the opposite side of said meter from the side of said meter engaged by said meter cradle,
l. yielding means interconnected between said frame and the inner end of said bar to normally swing the inner end of said bar downwardly,
m. and a stop on said frame adapted to engage said bar to limit said downward swinging movement of said bar.

References Cited in the file of this patent
UNITED STATES PATENTS

| | | |
|---|---|---|
| 1,368,687 | Bennetts | Feb. 5, 1921 |
| 1,455,974 | Solon | May 22, 1923 |
| 2,577,091 | Porter | Dec. 4, 1951 |
| 2,750,140 | Smith | June 12, 1956 |